United States Patent Office 3,343,260
Patented Sept. 26, 1967

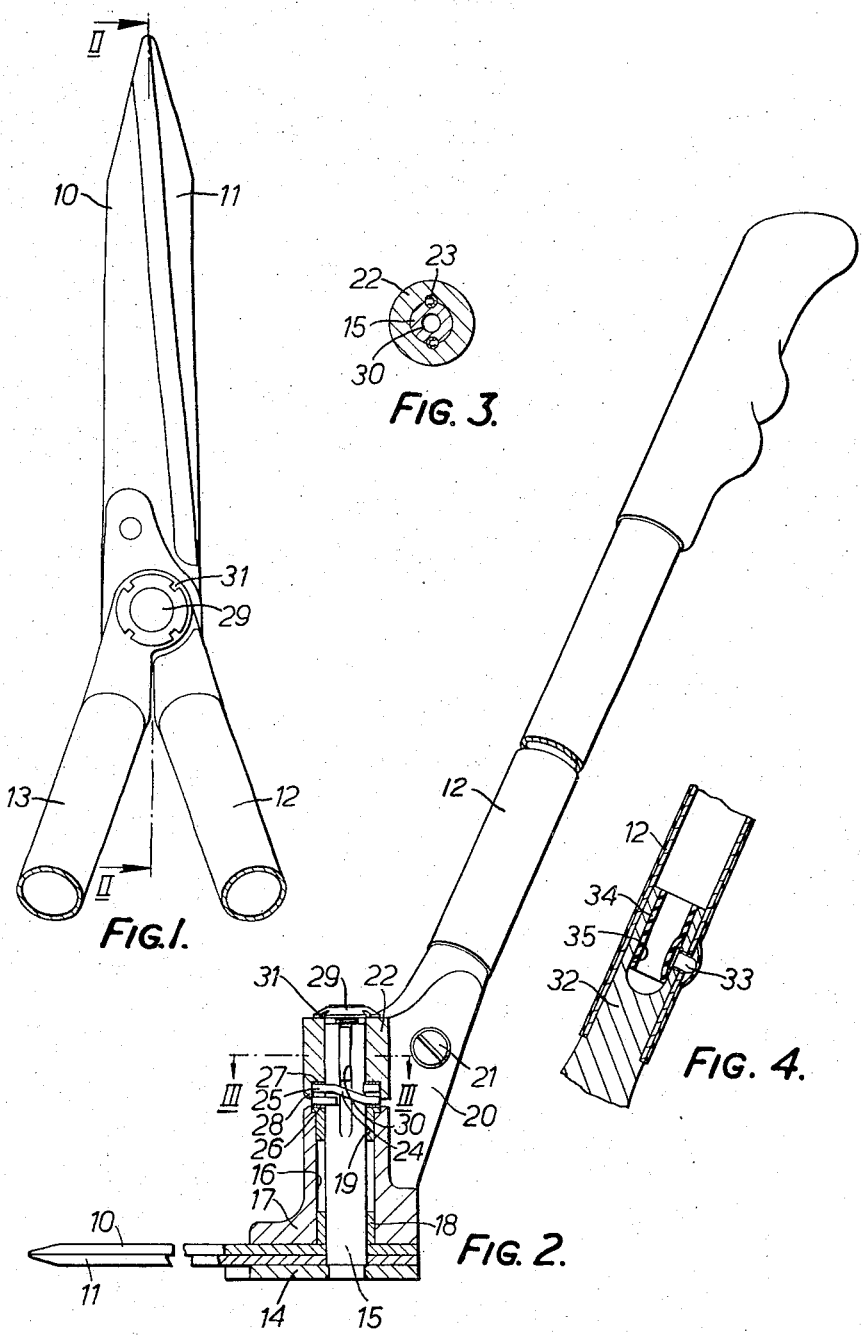

3,343,260
PIVOTALLY CONNECTED MEMBERS
Edward Albert Rogers, London, England, assignor to Wilkinson Sword Limited, London, England, a British company
Filed Nov. 22, 1965, Ser. No. 508,985
Claims priority, application Great Britain, Dec. 9, 1964, 50,012/64
8 Claims. (Cl. 30—248)

This invention relates to a pivot assembly for pivotally connecting two members each of which is elongated in a plane normal to the common pivotal axis, and relates particularly to a pivot assembly for a device including two members connected by the pivot assembly for movement relative to one another on the scissors principle. It will be evident that devices of this nature include such tools as scissors, shears, secateurs, pruners, tinsnips, pincers, and pliers.

With tools acting on a scissors principle, it is desirable that during cutting or shearing the two shearing members should not be readily separable in a direction parallel to their pivotal axis and furthermore that the common pivot of the two members should be so constructed that after considerable wear the scissors action is not materially impaired.

According to the present invention there is provided in a pivot assembly pivotally interconnecting two shearing members, a first elongate element attached to one of said members, a second elongate element attached to the other said member and having a bore which accommodate in bearing relationship at least part of said first elongate element, and a boss disposed at the end of said first elongate element remote from said members, and biasing means interposed between said boss and said second elongate element, said biassing means acting to urge said members towards one another.

An embodiment of a pivot assembly in accordance with the invention will now be described, by way of example, with reference to the accompanying drawing, in which:

FIG. 1 is a plan view of the pivot assembly when incorporated in a pair of long-handled shears, parts of the handle being omitted;

FIG. 2 is a partial section on the line II—II of FIG. 1;

FIG. 3 is a section on the line III—III of FIG. 2; and

FIG. 4 is a longitudinal section of a part of one handle of the shears.

The pivot assembly will be described as forming part of the long-handled shears including two shearing units shown in the drawings. The shearing units have blades 10, 11 and handles 12, 13, the blade 10 being rigid with the handle 12 and the blade 11 being rigid with the handle 13. The blade 11 is rigidly secured, for example by rivets, not shown, to a smooth-faced plate 14 having an aperture in which an end of reduced diameter of an elongate element in the form of a pivot pin 15 is brazed. The pivot pin 15 passes through bores in each of the blades 10, 11 and through a bore 16 in an elongate element in the form of a flanged boss 17 but does not extend beyond the plate 14. It will be appreciated from the drawing that the elongate elements of the pivot assembly have a length which is only a minor proportion of the overall length of the long-handled shears or other implement. The bore 16 carries two sintered-bronze bearing bushes 18, 19 arranged at each end thereof. The boss 17 is rigidly secured to the blade 10 by means of rivets (not shown). The boss 17 has an extension piece 20 which serves for securing the handle 12. A fillister-headed screw 21 is adjustably screwed into a tapped bore in the extension piece 20. By varying the number of packing washers below the head of the screw the overlap of the blades 10, 11 can be adjusted, thus screw 21 serves as an adjustable stop.

The handle 13 is secured at its lower end to a boss 22 which is keyed to that end of the pivot pin 15 which extends beyond the flanged boss 17, by means of a pair of tension pins 23. Each tension pin 23 is a C-section spring steel element and engages in opposing semi-circular section grooves in the boss 22 and in the pivot pin 15 (FIG. 3).

In order to maintain pressure between the blades 10 and 11 operational conditions, the bosses 17 and 22 are spring-biased apart by a helical spring washer 24 of rectangular section which lies between two plain washers 26, 27. The washer 26 abuts against the outer end face of the bearing bush 19 and the washer 27 abuts an end face of the boss 22, lying at the base of a recess 28.

The blade units are held together by a flat-headed screw 29 which engages in a tapped axial bore 30 of the pivot pin 15. The screw 29 is provided with four slots 31 for engagement by a key.

Each handle 12, 13 is secured to a projecting cylindrical portion 32 (FIG. 4) of each of the bosses 17, 22 by means of a button 33 resiliently-biased outwardly through apertures in the portion 32 and in the handle by a hollow cylindrical rubber bush or sleeve 34 fitted within a bore 35 in the portion 32 of the boss. By depressing the button the handle can readily be detached. It will be appreciated that the arrangement illustrated in FIG. 4 is intended to be used for many other purposes and the arrangement should not be considered as applicable only as a coupling for a detachable handle of a pair of shears.

Each handle 12, 13 may be provided with a covering of a synthetic-resin sleeving, for example, of nylon, and the button may lie below this sleeving.

With previously proposed tools, such as shears and pruners, including a pivot assembly as hereinbefore described the bearing length of the pivot is confined to the thickness of one of the blades, thus causing the forces acting as a result of a cutting or shearing operation to be concentrated on a relatively small bearing area. There is therefore a tendency, which is accentuated by the increased wear resulting from the high loading of the bearing area, for the blades to twist or rock during use.

By use of the pivot assembly as hereinbefore described, it will be evident that the area of the bearing surfaces formed between the sleeve or other elongate member and the pin is many times that of a conventional pivot assembly for shears, pruners or similar tools. As a result the rate of wear of the bearing surfaces and consequential rocking tendency is substantially reduced.

I claim:
1. A pair of shears comprising
   two blades at least one of which has a bore therein,
   a pivot pin secured to one said blade, extending normally from the upper surface thereof, having a tapped bore therein at the end remote from said one blade and passing through the bore in the other said blade,
   a flanged boss having a bore therein co-axial with a part of the pivot pin, the flange of the boss being rigid with said other blade,
   a pair of bearing bushes mounted in the boss of said flanged boss spaced from one another and supporting the pin therein,
   a boss mounted on an end portion of the pin remote from the blades,
   a helical compression spring acting between that end face of the boss nearer the blades and the end face of the flanged boss remote from the blades,
   a flat-headed screw engaging in the tapped bore in the pivot pin to secure the boss against axial movement, extension pieces rigid with the said boss and said flanged boss respectively, and a handle detachably secured to each said extension piece.

2. In a pivot assembly pivotally interconnecting two shearing members, a first elongate element attached to one of said members, said first element having a tapped bore in the end thereof remote from the shearing members and a longitudinally-extending semi-circular section groove, a second elongate element attached to the other said member and having a bore which accommodates in bearing relationship at least part of said first elongate element, a boss disposed at the end of said first elongate element remote from said members, said boss having a longitudinally-extending internal semi-circular section groove corresponding to the groove of the first elongate element, a flat-headed screw engaged in the said tapped bore to hold the boss in its required axial position, a C-section pin enaged in said grooves to prevent relative rotation between the boss and the first elongate element, and biassing means interposed between said boss and said second elongate element and acting to urge said members towards one another.

3. In a pivot assembly interconnecting two shearing members, a first elongate element attached to one of said members, a second elongate element attached to the other said member and having a bore which accommodates in bearing relationship at least part of said first elongate element, a boss disposed at the end of said first elongate element remote from said members, a flat plate having a bore in which one end of the first elongate element is a force fit and having apertures therein, a rivet in each said aperture securing said plate to the corresponding member, and biassing means interposed between said boss and said second elongate element, said biassing means acting to urge said members towards one another.

4. In a pivot assembly pivotally interconnecting two shearing members, a first elongate element attached to one of said members, a second elongate element attached to the other said member and having a bore which accommodates in bearing relationship at least part of said first elongate element, a boss disposed at the end of said first elongate element remote from said members, biassing means interposed between said boss and said second elongate element and acting to urge said members towards one another, a first handle, a second handle, an extension piece rigid with the corresponding said elongate element having a cylindrical portion with a blind co-axial bore therein, and a generally radially-extending transverse opening from said bore, a sleeve of resilient material in the blind bore exerting a generally radial outward force, and a button in said opening biased outwardly by said resilient sleeve, each said handle being hollow at at least one end and having a transverse opening therein such that on engagement of the hollow end over the corresponding extension piece, the button is made to engage in said transverse opening in the handle to secure the handle to the extension piece.

5. A pair of shears comprising two blades at least one of which has an aperture therein, a pivot pin secured to one said blade, extending normally from the upper surface thereof and passing through the aperture in the other said blade, a flanged boss having an aperture herein co-axial with a part of the pivot pin, the flange of the boss being rigid with said other blade, a pair of bearing bushes mounted in the aperture of said flanged boss spaced from one another and supporting the pin therein, a boss mounted on an end portion of the pin remote from the blades, a compression spring acting between that end face of the boss nearer the blades and the end face of the flanged boss remote from the blades, securing means engaging the pivot pin to secure the boss against axial movement, extension pieces rigid with the said boss and said flanged boss respectively, and a handle detachably secured to each said extension piece.

6. In a pivot assembly pivotally interconnecting two shearing members, a first elongate element attached to one of said members, said first element having a bore in the end thereof remote from the shearing members and a keyway, a second elongate element attached to the other said member and having a bore which accommodates in bearing relationship at least part of said first elongate element, a boss disposed at the end of said first elongate element remote from said shearing members, said boss having a keyway corresponding to the keyway of the first elongate element, a securing member engaged in the said bore in the first elongate element to hold the boss in its required axial position, a key engaged in said keyways to prevent relative rotation between the boss and the first elongate element, and resilient biasing means interposed between said boss and said second elongate element and acting to urge said members towards one another.

7. In a pivot assembly interconnecting two shearing members, a first elongate element attached to one of said members, a second elongate element attached to the other said member and having a bore which accommodates in bearing relationship at least part of said first elongate element, a boss disposed at the end of said first elongate element remote from said members, a plate-like member having an aperture in which is secured one end of the first elongate element and having further apertures therein, securing means in each said further aperture securing said plate to the corresponding member, and resilient biasing means interposed between said boss and said second elongate element, said biasing means acting to urge said members towards one another.

8. In a pivot assembly pivotally interconnecting two shearing members, a first elongate element attached to one of said members, a second elongate element attached to the other said member and having a bore which accommodates in bearing relationship at least part of said first elongate element, a boss disposed at the end of said first elongate element remote from said members,
resilient biasing means interposed between said boss and said second elongate element and acting to urge said members toward one another,
a first handle,
a second handle,
an extension piece rigid with the corresponding said elongate element having a cylindrical portion with a longitudinally-extending bore therein, and a generally radially-extending transverse opening extending from said bore,
a member of elastomer material in the bore exerting a generally radial outward force, and
a button in said transverse opening biased outwardly by said resilient member,
each said handle being hollow at at least one end and having a transverse opening therein such that on engagement of the hollow end over the corresponding extension piece, the button is made to engage in said transverse opening in the handle to secure the handle to the extension piece.

References Cited

UNITED STATES PATENTS

| | | | |
|---|---|---|---|
| 541,294 | 6/1895 | Smith | 30—257 |
| 798,307 | 8/1905 | Taylor | 30—248 |
| 1,349,563 | 8/1920 | Day | 30—271 X |
| 1,845,798 | 2/1932 | Keiser | 30—257 |
| 2,284,859 | 6/1942 | Blair | 30—248 |
| 3,046,722 | 7/1962 | Bridegum | 30—248 X |

FOREIGN PATENTS

| | | |
|---|---|---|
| 570,155 | 6/1945 | Great Britain. |
| 666,562 | 2/1952 | Great Britain. |

WILLIAM FELDMAN, *Primary Examiner.*

BERNARD A. GELAK, *Examiner.*

J. C. PETERS, *Assistant Examiner.*